May 18, 1926.

P. LAFORGE

SHOCK ABSORBER

Filed August 4, 1924

1,585,156

Inventor:
Pierre Laforge

Patented May 18, 1926.

1,585,156

UNITED STATES PATENT OFFICE.

PIERRE LAFORGE, OF PARIS, FRANCE.

SHOCK ABSORBER.

Application filed August 4, 1924. Serial No. 729,879.

My invention relates to a shock absorber intended more particularly for automobile vehicles.

This shock absorber comprises essentially a fixed circular friction surface or drum firmly connected with a support and around which is wound in a suitable manner a brake band consisting of a belt, cable or other flexible brake member, one of the ends of which is fixed to the chassis of the vehicle for example, whilst the other end is attached to a loop supported by the belt itself which thus forms a running noose around the friction surface. A spring, the tension of which can be regulated is mounted on a fixed or movable spindle and which is connected to the loop of the brake band, assures a uniform tension of this band between the chassis and the axle. By varying the tension of the spring it is possible to vary likewise the initial adherence of the brake band and consequently the resistance obtained.

The accompanying drawing by way of example shows one embodiment of my invention.

Figure 1:
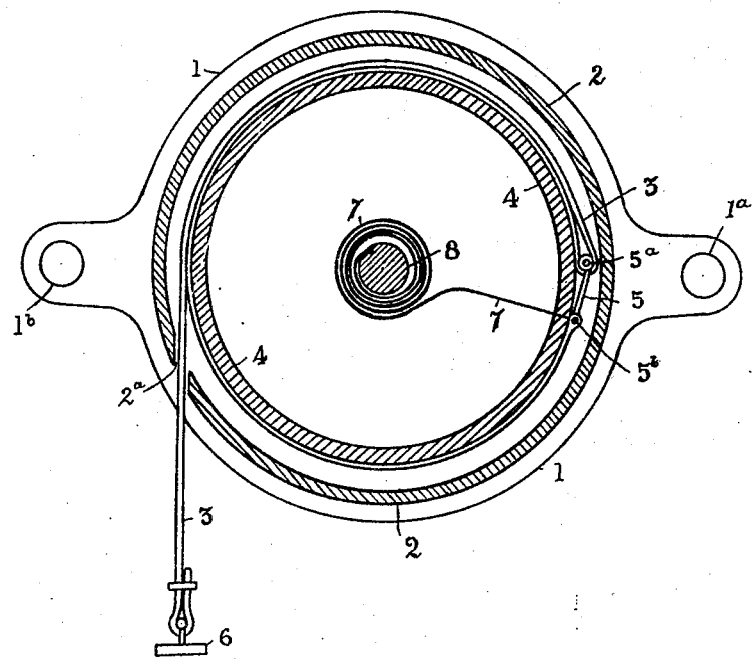
Fig. 1 is an elevation partly in section.
Figure 2:
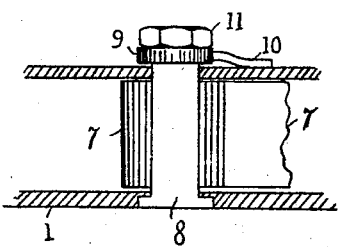
Fig. 2 represents the whole regulating arrangement in horizontal section.

1 indicates a support provided with two fixing lugs $1^a$ and $1^b$ serving to mount the shock absorber on the chassis of the vehicle. This support carries a casing 2, containing the controlling apparatus. A belt 3 or a cable is wound around a circular brake drum 4, fixed to or formed on the support 1. The belt is passed through the loop 5 and doubled back upon itself around a roller or sleeve $5^a$ on the loop so as to form a running noose around the brake drum 4. The ends of the belt or of the cable 3 are fixed on the one hand to the part $5^b$ of the loop 5 and on the other hand to a connecting lug 6 fixed to the axle of the vehicle. The loop 5 is connected by a spring 7 to a spindle 8 which is provided with a ratchet pinion 9 (Fig. 2) in engagement with a pawl 10. The tension of the spring 7 can be regulated by turning the spindle 8 by applying a spanner or key to a head 11 on the spindle which when the desired tension is obtained is locked by the engagement of the pawl with the pinion 9.

The action of this apparatus is as follows:

When, in consequence of a shock transmitted through the wheels to the axle of the vehicle, the lug 6 comes near to the support 1, the belt 3 is held stretched by the loop 5 which moves along the friction surface 4 under the action of the spring 7. The adherence of the belt on the friction surface is thus always assured.

The belt grips the friction surface only when the lug 6, connected with the axle of the vehicle moves away from the support 1. In this case the belt tends to contract the noose and the friction surface, so that the downward movement of the lug 6 is retarded.

In order to obtain a more complete adherence between the belt and drum a ferodo or other similar substance may be interposed.

The adherence of the belt and consequently the resistance can be regulated by adjusting the tension of the spring 7 which tensions the belt 3 through the medium of the loop 5.

It is quite evident that in its initial working position the loop 5 may occupy any desired position on the friction surface. However, in the example illustrated, the position chosen is one which allows of the belt being passed tangentially through a slot $2^a$ in the casing 2.

This arrangement can evidently be employed for braking any kind of movement, and in case of necessity recourse may be had to modifications without departing from the principle of the invention.

Likewise, the details of construction and mounting might be modified according to circumstances.

Further, the various constituent parts might be replaced by others performing the same office or giving the same result. It is of course also understood that any material or any product may be utilized that is capable of being employed in the construction of these apparatus.

I claim:—

1. A shock absorber comprising in combination with a support, a fixed drum, a flexible member encircling said drum and formed with a running noose, and means for maintaining said noose adhering to said drum irrespective of the position of said flexible member on said drum.

2. A shock absorber comprising in combination with a support, a fixed drum, a flexible member encircling said drum and formed with a running noose, a spindle rotatably mounted in said support, and a spring connecting said spindle and said noose for maintaining the latter adhering to said drum irrespective of the position of said flexible member on said drum.

3. A shock absorber comprising in combination with the support, a fixed drum, a loop, a flexible member encircling said drum and having one end secured to said loop and its other end loosely passing through the same, and being doubled on itself so as to form a running noose, a spindle rotatably mounted in said drum, and a spring connecting said spindle and said loop for maintaining the latter adhering to said drum irrespective of the position of said flexible member on said drum.

4. A shock absorber as specified in claim 3, comprising a means for adjusting the tension of said spring.

5. A shock absorber as specified in claim 3, comprising a ratchet wheel at the end of said spindle and a pawl provided on said support in engagement with said ratchet wheel for adjusting the tension of said spring.

In testimony whereof he has affixed his signature.

PIERRE LAFORGE.